(12) United States Patent
Moses

(10) Patent No.: US 11,438,173 B2
(45) Date of Patent: Sep. 6, 2022

(54) METHODS AND APPARATUS FOR PROVIDING BLOCKCHAIN PARTICIPANT IDENTITY BINDING

(71) Applicant: Entrust, Inc., Dallas, TX (US)

(72) Inventor: Timothy Edward Moses, Ottawa (CA)

(73) Assignee: ENTRUST, INC., Dallas, TX (US)

( * ) Notice: Subject to any disclaimer, the term of this patent is extended or adjusted under 35 U.S.C. 154(b) by 142 days.

(21) Appl. No.: 16/915,221

(22) Filed: Jun. 29, 2020

(65) Prior Publication Data
US 2020/0328901 A1 Oct. 15, 2020

Related U.S. Application Data

(62) Division of application No. 15/715,432, filed on Sep. 26, 2017, now Pat. No. 10,749,684.

(60) Provisional application No. 62/402,226, filed on Sep. 30, 2016.

(51) Int. Cl.
| | |
|---|---|
| *H04L 29/06* | (2006.01) |
| *G06F 21/00* | (2013.01) |
| *H04L 9/32* | (2006.01) |
| *H04L 9/40* | (2022.01) |
| *H04L 9/06* | (2006.01) |
| *H04L 9/14* | (2006.01) |
| *H04L 9/30* | (2006.01) |
| *H04L 9/00* | (2022.01) |

(52) U.S. Cl.
CPC .......... *H04L 9/3247* (2013.01); *H04L 9/0637* (2013.01); *H04L 9/14* (2013.01); *H04L 9/30* (2013.01); *H04L 9/3236* (2013.01); *H04L 9/3263* (2013.01); *H04L 63/0442* (2013.01); *H04L 9/50* (2022.05)

(58) Field of Classification Search
CPC ....... H04L 9/3247; H04L 9/0637; H04L 9/14; H04L 9/30; H04L 9/3236; H04L 9/3263; H04L 63/0442; H04L 2209/38
See application file for complete search history.

(56) References Cited

U.S. PATENT DOCUMENTS

| | | |
|---|---|---|
| 9,397,985 B1 | 7/2016 | Seger, II et al. |
| 2010/0235281 A1 | 9/2010 | Cornillon |
| 2013/0103802 A1 | 4/2013 | Kawato |

(Continued)

FOREIGN PATENT DOCUMENTS

| | | |
|---|---|---|
| CN | 105701372 A | 6/2016 |
| KR | 10-1637854 B1 | 7/2016 |
| KR | 10-1637868 B1 | 7/2016 |

OTHER PUBLICATIONS

European Patent Office; International Search Report and Written Opinion; International Application No. PCT/US2017/053618; dated Nov. 29, 2017.

(Continued)

*Primary Examiner* — Lisa C Lewis

(57) ABSTRACT

A method and apparatus provides a blockchain that includes one or more blocks that contain a cryptographic binding of a signature-verification public key and/or a data encryption public key to the identity of the holder of the corresponding private key. The binding is performed by one or more key binding entities, referred to herein as a blockchain identity binder. Originators and recipients use the identity binding data to secure block chain transactions.

2 Claims, 5 Drawing Sheets

BLOCK CHAIN DATA STRUCTURE WITH PBKEY-ID BINDING DATA

SIGNED BLOCKCHAIN PARTICIPANT IDENTITY BINDING DATA

(56) References Cited

U.S. PATENT DOCUMENTS

| | | |
|---|---|---|
| 2013/0227543 A1 | 8/2013 | Chen |
| 2015/0178532 A1 | 6/2015 | Brule |
| 2015/0244690 A1 | 8/2015 | Mossbarger |
| 2015/0332395 A1 | 11/2015 | Walker et al. |
| 2016/0164884 A1 | 6/2016 | Sriram et al. |
| 2016/0253622 A1 | 9/2016 | Sriram et al. |
| 2016/0330027 A1 | 11/2016 | Ebrahimi |
| 2017/0236123 A1* | 8/2017 | Ali ................. G06Q 20/3825 705/75 |
| 2017/0346639 A1* | 11/2017 | Muftic ............. H04L 9/3263 |
| 2017/0353311 A1 | 12/2017 | Schukai |
| 2018/0048461 A1 | 2/2018 | Jutla |
| 2018/0097635 A1 | 4/2018 | Moses |
| 2018/0114220 A1* | 4/2018 | Ekberg .............. H04L 9/007 |
| 2018/0240101 A1 | 8/2018 | Chan |

OTHER PUBLICATIONS

Fromknecht, Conner et al.; A Decentralized Public Key Infrastructure with Identity Retention; International Associate for Cryptologic Research; Nov. 11, 2014.

U.S. Patent and Trademark Office; Non-Final Rejection; U.S. Appl. No. 15/715,432; dated Jun. 25, 2019.

U.S. Patent and Trademark Office; Final Rejection; U.S. Appl. No. 15/715,432; dated Dec. 9, 2019.

International Preliminary Reporton Patentability received for PCT Patent Application No. PCT/US2017/053618, dated Apr. 11, 2019, 9 pages.

* cited by examiner (BINDER, ORIGINATOR, RECIPIENT, RA)

SIGNED BLOCKCHAIN PARTICIPANT IDENTITY BINDING DATA

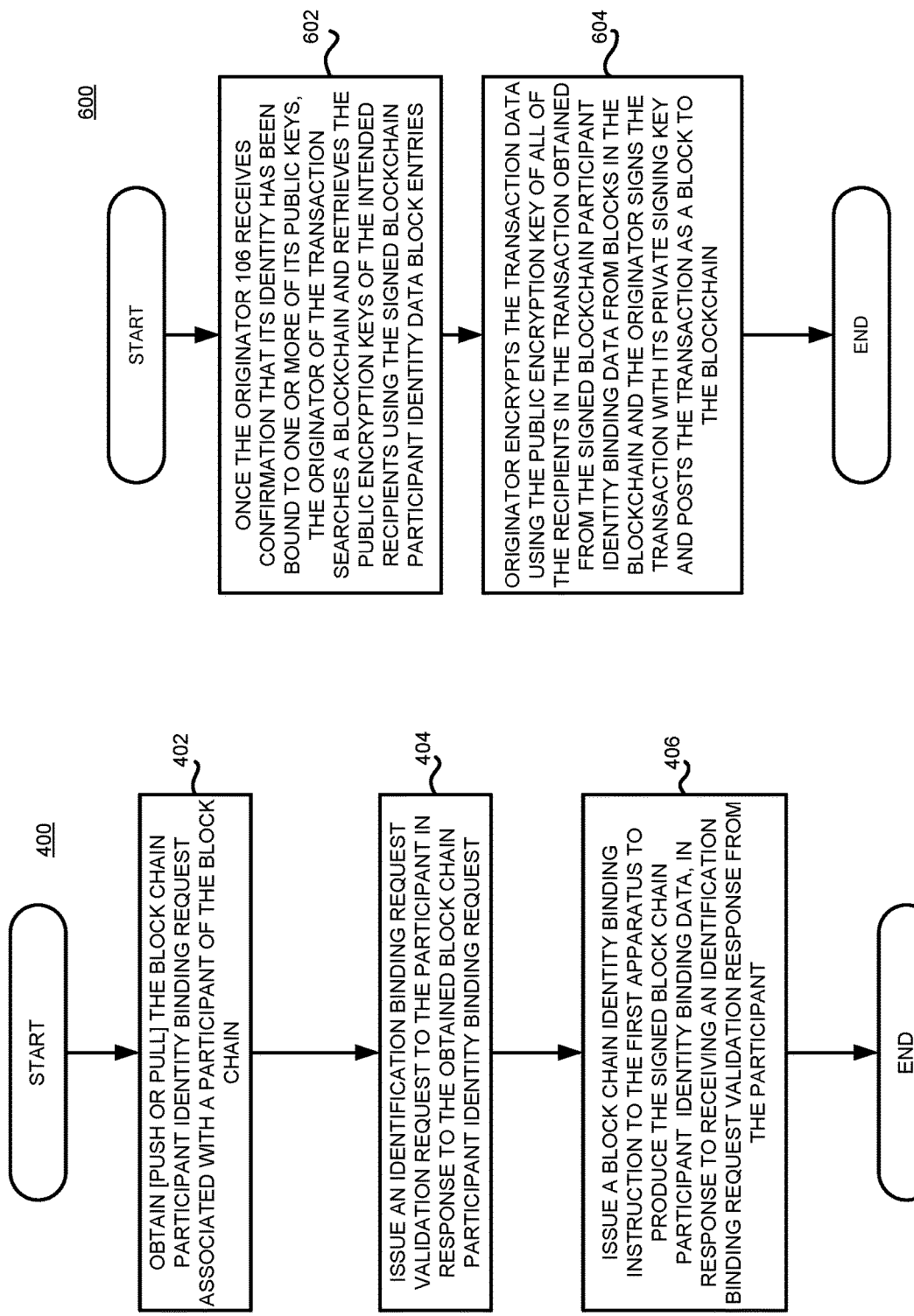

RECIPIENT

BINDER

METHODS AND APPARATUS FOR PROVIDING BLOCKCHAIN PARTICIPANT IDENTITY BINDING

RELATED APPLICATIONS

This application is a divisional of application Ser. No. 15/715,432, filed on Sep. 26, 2017, which claims priority to Provisional Application Ser. No. 62/402,226, filed on Sep. 30, 2016, and are incorporated herein by reference.

BACKGROUND OF THE DISCLOSURE

The present disclosure relates to methods and apparatus that employ blockchain systems.

Blockchain systems are sometimes referred to as global state systems wherein global states are stored across a distributed number of devices via the Internet. A combination of public/private key cryptography and hash chains provide a mechanism to store arbitrary secure states as a single ledger (i.e., the blockchain) held at all distributed nodes. Nodes may update their local state based on a consensus algorithm applied to the system as a whole. Blockchain systems are also referred to as distributed ledger systems and can facilitate real time and secure data sharing. Some system examples include Ripple, Multichain and the Hyper Ledger Project. Digitally recorded "blocks" of data are stored in a linear chain. Each block in a chain contains data which can include a transaction which is cryptographically hashed. The blocks of hashed data draw upon the previous hashed block which comes before in the chain, insuring illegitimate modifications to the data can be detected and rejected.

In the global or public transaction blockchain systems such as bitcoin, typically no source attribution is provided, they are pseudonymous. In contrast, permission based blockchain systems, i.e., those that require participants to have permission to read and/or write to the block chain, may use source attribution data which may provide more control amongst participants, such as originators of transactions, recipients of transactions, and other entities that create and access the blockchain. However, known permission based blockchain systems may not provide effective source attribution security that can be required for blockchains that require enhanced security thereby exposing the block chain to fraudulent impersonation of originators and/or recipients resulting in, inter alia, data theft.

BRIEF DESCRIPTION OF THE DRAWINGS

The embodiments will be more readily understood in view of the following description when accompanied by the below figures and wherein like reference numerals represent like elements, wherein:

FIG. 4 is a flowchart illustrating a method for providing blockchain data in a blockchain in accordance with one example set forth in the disclosure;

FIG. 6 is a flowchart illustrating a method for providing blockchain data in a blockchain in accordance with one example set forth in the disclosure.

DETAILED DESCRIPTION OF THE PREFERRED EMBODIMENTS

Figure 1:
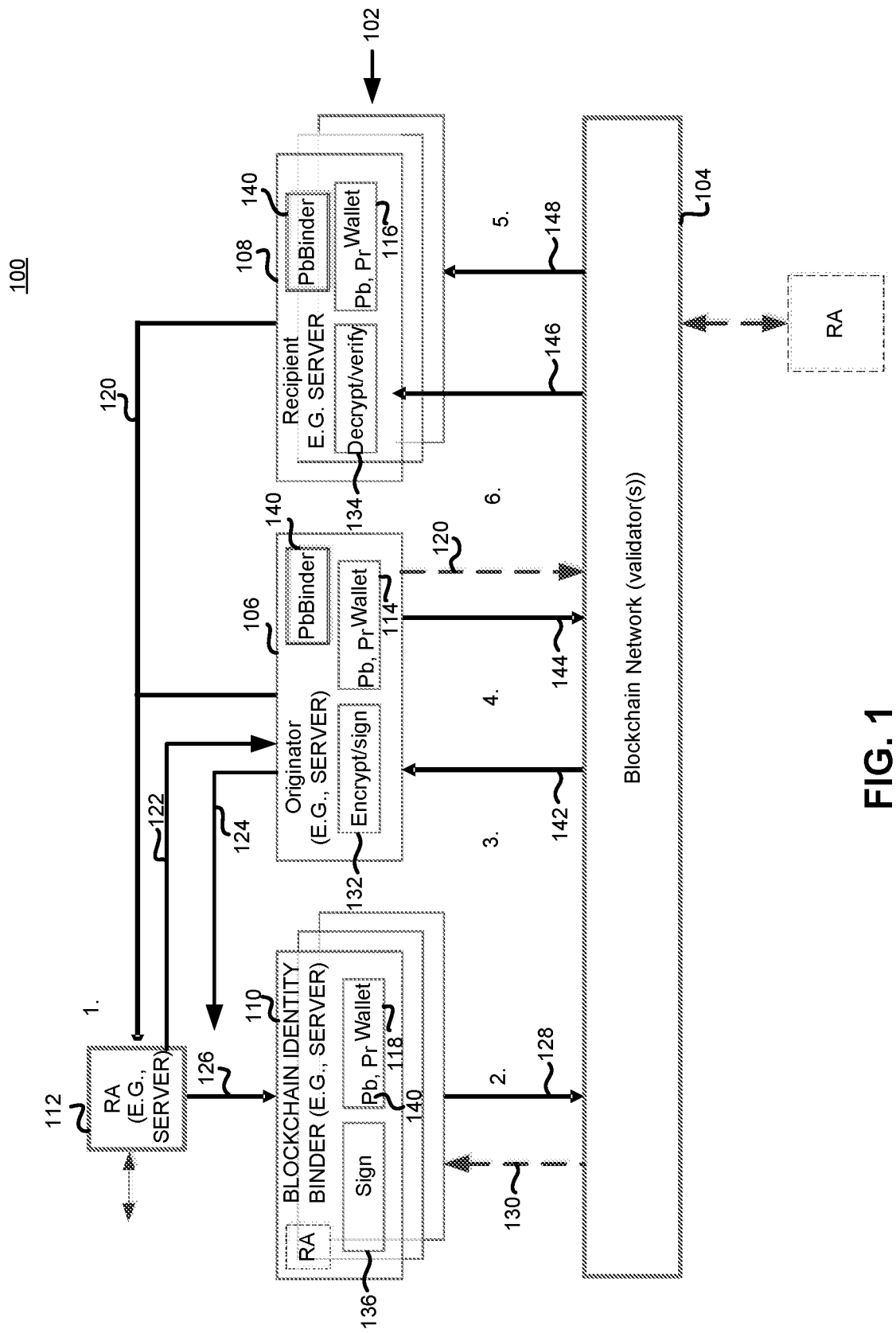
FIG. 1 is a block diagram illustrating a blockchain system in accordance with one example set forth in the disclosure.

Briefly, a method and apparatus provides a blockchain that includes one or more blocks that contain a cryptographic binding of a signature-verification public key and/or a data encryption public key to the identity of the holder of the corresponding private key. The binding is performed by one or more key binding entities, referred to herein as a blockchain identity binder. Originators and recipients use the identity binding data to carry out block chain transactions. In one example, the blockchain identity binder acts under the instruction of a registration authority which in one example, is a server that occupies an authoritative role related to the transactions that are contained within the blockchain. The blockchain may be used for many different types of transactions including, but not limited to, transactions involving: the provisioning of software code update modules within the blockchain to provision software upgrades in a secure manner, product tracking of products in a supply chain, financial transaction data between financial institutions, government records or other records that are communicated amongst differing governmental entities or corporate entities, contractual transactions for real estate transactions including management of land records, or any other suitable transactions.

Providing the binding of an identity of an originator of a transaction to the requisite public keys of the originator (or recipient(s)), can provide improved security through one or more of source authentication and/or confidentiality. The originator of a transaction can obtain a reliable copy of the intended recipients' encryption keys to improve confidentiality. An improved level of security can be provided from the additional verification of the identity information in conjunction with conventional transaction verification provided in blockchains. Fewer identity registration steps are required by comparison with a peer-to-peer approach, resulting in lower cost.

In one example, a method carried out by at least a first apparatus, such as a blockchain identity binder, produces signed blockchain participant identity binding data in response to a blockchain participant identity binding request from the participant. The signed blockchain participant identity binding data includes a cryptographically signed public key of the participant and corresponding participant identity information associated with the participant. In one example, the blockchain participant identity binding data also includes binding meta-data such as but not limited to one or more of the following: expiry data indicating when the signed blockchain participant identity binding data expires and can no longer be trusted and binding event description data such as one or more of a type of identity lifecycle binding event (e.g. an initial binding, renewal of a prior binding, withdrawal of the binding). In one example, when expiry data is used, the recipient checks the current date against an expiry date in the meta data in the block chain for the bound public key of the originator and if the binding has expired then the recipient will not accept the transaction and inserts data in the block chain indicating non-acceptance. If the recipient cannot locate a block in the block chain that provides a non-withdrawn and non-expired originator binding, the transaction is not considered valid.

The blockchain participant identity binding request is sent from the participant, can be retrieved from the participant or can be included in a block in the blockchain by the participant. The blockchain participant identity binding request includes the participant public key(s) (e.g., public signature verification key and public encryption key) and corresponding participant identity information, such as data representing a name of the participant (Company A, Government Agency A, etc.), network address, email address, electronic data interchange (EDI) participant id, directory name, username, or any other suitable identification information. The blockchain identity binder posts to the blockchain the signed blockchain participant identity binding data, in response to the blockchain participant identity binding request.

In one example, a registration authority obtains the blockchain participant identity binding request from a participant of the blockchain wishing to have their identity bound to their public keys and issues an identification binding request validation request back to the participant in response to the obtained blockchain participant identity binding request. This is done to insure that the identity binding request is not coming from an impersonating requestor. The registration authority issues a blockchain identity binding instruction to the blockchain identity binder to produce the signed blockchain participant identity binding data. The blockchain identity binding instruction includes the participant's (the requesting participant's) public key(s) and the corresponding validated participant identity information that are to be cryptographically bound. This is done in response to the registration authority receiving an identification binding request validation response from the participant that confirms that the participant made the blockchain participant identity binding request.

In one example, producing the signed blockchain participant identity binding data includes producing signed blockchain originator and/or recipient identity binding data including a cryptographically signed public encryption and/or signature verification key of a transaction originator and corresponding originator identity information associated with the originator. In one example, producing signed blockchain recipient identity binding data includes cryptographically signing a public encryption and/or verification key of a transaction recipient and corresponding recipient identity information associated with the recipient.

In one example a recipient (e.g., server employed as a recipient device) to the transaction accesses blockchain data in a blockchain, searches for one or more intended transaction blocks in the blockchain based on recipient identification information such as a recipient identifier (ID), a public key of the recipient, or a public key ID of the recipient. The recipient determines, from one or more blocks in the blockchain, an originator identity corresponding to an originator of the transaction, based on signed blockchain participant identity binding data in a block. Such a block includes the signed blockchain participant identity binding data which includes the cryptographically signed public key of the originator and corresponding originator identity information associated with the originator. The recipient verifies that the signed blockchain participant identity binding data is signed by a trusted blockchain identity binder using a public key signature verification key associated with the blockchain identity binder (also referred to as a binding entity), when verified, the recipient uses the public key of the originator from the signed blockchain participant identity binding data to verify a transaction from a block in the blockchain. This verification serves to verify who originated the transaction and that the transaction has not been altered. The digital signature on the transaction verifies correctly with the public key in the binding data so that the transaction is linked to the signed identity data.

In one example the various apparatus for providing blockchain data in a blockchain include one or more processors and memory that includes executable instructions that when executed by the one or more processors cause the one or more processors to perform the operations described herein. However any suitable logic configuration may be used.

FIG. 1 illustrates one example of a blockchain system 100 that includes a number of participant apparatus generally shown as 102 that are in communication via known techniques such as through the Internet, wireless networks, cloud networks or other suitable links. The participant apparatus 102 may be implemented as any suitable structure including servers, handheld devices, or any suitable computing device that operates in connection with a blockchain 104. In this example the blockchain system 100 is a permission based blockchain system. However, any suitable blockchain system may be employed. In this example, one participant is designated as an originator 106 which originates a transaction, and another participant is designated as a recipient 108 that is the recipient in the transaction. It will be recognized that each of these devices may operate as multiple types of participants so that the originator becomes a recipient and a recipient becomes an originator depending upon the type of transaction desired. The blockchain system 100 also includes a blockchain identity binder 110 that communicates with a registration authority 112.

Figure 2:
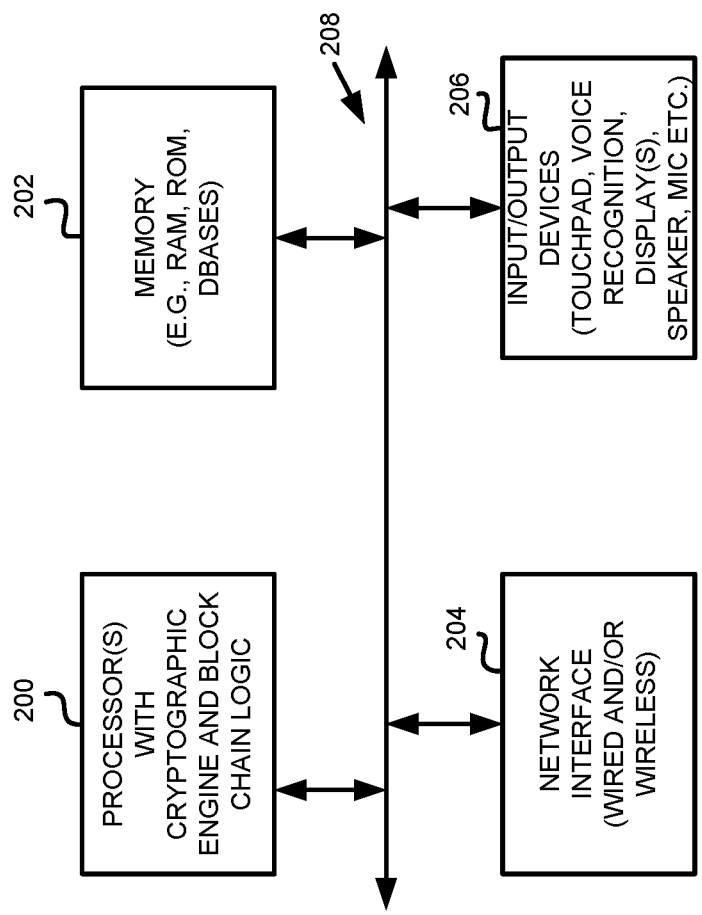
FIG. 2 is a block diagram illustrating a binder entity, originator, recipient and if desired, a registration authority in accordance with one example set forth in the disclosure.

Referring also to FIG. 2, each of the originator 106 and recipient 108, blockchain identity binder 110 and if desired, registration authority 112 may be a computing device that includes one or more processors 200, such as, but not limited to, a central processing unit, a graphics processing unit, digital signal processor, discrete logic, field programmable gate array or any other suitable structure. In this example, the originator 106, recipient 108, blockchain identity binder 110, and RA 112 are configured as independent servers each having a requisite processor 200, corresponding memory 202 that is used for multiple purposes including storing executable instructions that when executed, cause the processor 200 to carry out the operations described herein. Each of the apparatus may include one or more network interfaces 204 to interface either wirelessly or through a wired connection to one or more networks to allow communication amongst the various apparatus as described herein and to provide a blockchain for a distributed ledger. The apparatus may include input/output devices 206 such as, but not limited to, touchpads, displays, voice recognition systems or any other systems. As known in the art, the various components may be in communication through any suitable communication paths generally designated as 208 as noted above. The originator 106, recipient 108 and blockchain identity binder 110 include cryptographic engines and blockchain logic that provide public key cryptographic functions and other cryptographic functions to produce blocks for inclusion into the blockchain, for searching the blockchains and accessing the blockchains as known in the art.

Referring back to FIG. 1, the originator 106 employs a cryptographic engine 132 to produce a public and private key pair(s) 114, the private key(s) being stored in a secure wallet. Cryptographic engines of the originator, recipient and binder are configured to perform standard public key cryptographic signing operations, cryptographic verification operations, cryptographic encryption operations, decryption operations, hash operations, asymmetric key based operations and any other needed blockchain operations, as known in the art. The cryptographic engines may be implemented by a processor executing suitable software code and may be stored in memory as known in the art. Alternatively, hardware chips may be designed as the cryptographic engines as known in the art. Any suitable structure may be employed.

In this example, the originator 106 will be referred to as having a public signature verification key and/or public encryption key and corresponding digital private signing key and private decryption key. It will be recognized that the public private key pairs may be generated by the respective cryptographic engine or from other sources. Likewise, the recipient 108 includes a similar cryptographic engine 134 that generates public and private key pairs designated as 116. The blockchain identity binder 110 also includes a cryptographic engine 136 that generates public key based cryptographic operations, a private signing key and public verification key designated as 118 and performs relevant public key based cryptographic operations such as signing of data. System participants 106 and 108 request a public key to be bound to their respective identity data from the registration authority 112 via a blockchain participant identity binding request 120. In the case of the originator 106, a blockchain participant identity binding request 120 is sent to the registration authority 112 and includes the public encryption key and public verification key of the originator along with originator identity data which may include, for example, the name of the originator, such as an institution name or any other identifying information that identifies the originator uniquely.

Referring to FIG. 4, a method 400 for providing blockchain data in a blockchain is illustrated as taken from the perspective of the registration authority 112. The figure also illustrates processing an identity binding request. As shown in block 402, the registration authority 112 obtains the blockchain participant identity binding request 120 that is associated with a participant of the blockchain either through a push operation or a pull operation meaning that the originator can send the message through an Internet interface of the RA 112 such as through a web page or web services API. The RA 112 may poll the participants 106 and 108 and ask for the request if desired, or the participants can place their requests as blocks in the blockchain. Any other suitable mechanism may also be used.

In this example, as shown in block 404, the registration authority 112 issues an identification binding request validation request 122 back to the participant that sent the blockchain participant identity binding request 120 to ask for confirmation that the participant in fact made the request for an identity binding. This may take any suitable form including a message indicating the received public key and corresponding identity information that was sent in the identity binding request 120 back to the participant that is designated in the request. In one example, in response to receiving the blockchain participant identity binding request 120, the registration authority 112 confirms that the identity information included in the request 120 actually corresponds to a valid participant in the blockchain system through any suitable mechanism. In one example, the registration authority 112 uses a secure database where participants previously registered with the registration authority 112 providing identification data, alternatively the registration authority 112 may send an out of band communication such as an email, telephone inquiry or other inquiry to an address of the participant requesting confirmation that they are making a request for an identity binding (as represented by 122). The purpose is to ensure that rogue entities are not requesting identity bindings; this provides improved security for the system.

In response to the identification binding request validation request 122, the participant if it did in fact send the identity binding request 120, returns an identification binding request validation response 124 back to the registration authority 112. As shown in block 406, the method includes issuing a blockchain identity binding instruction 126 to the blockchain identity binder 110 to produce signed blockchain participant identity binding data 128. This is done in response to receiving the identification binding request validation response 124 from the participant. The blockchain identity binding instruction 126 includes the participant's public key(s) and corresponding identification information that was provided in the blockchain participant identity binding request 120 so that it is passed onto the blockchain identity binder 110. The binder 110 performs cryptographic binding of the information in a trusted manner. It will be recognized that the registration authority 112 although shown to be a different and third party server than the binder server 110 may be incorporated within the blockchain identity binder 110 as shown in dashed lines or may directly interface with the blockchain 104 as shown by dashed lines. In this embodiment, the registration authority 112 searches blocks in the blockchain for blockchain participant identity binding requests 120 and creates a block instructing the blockchain identity binder 110 to perform a binding operation which is shown by dashed line 130. The originator or other participant can initiate the blockchain participation identity request 120 as shown in dashed line 120.

Figure 5:
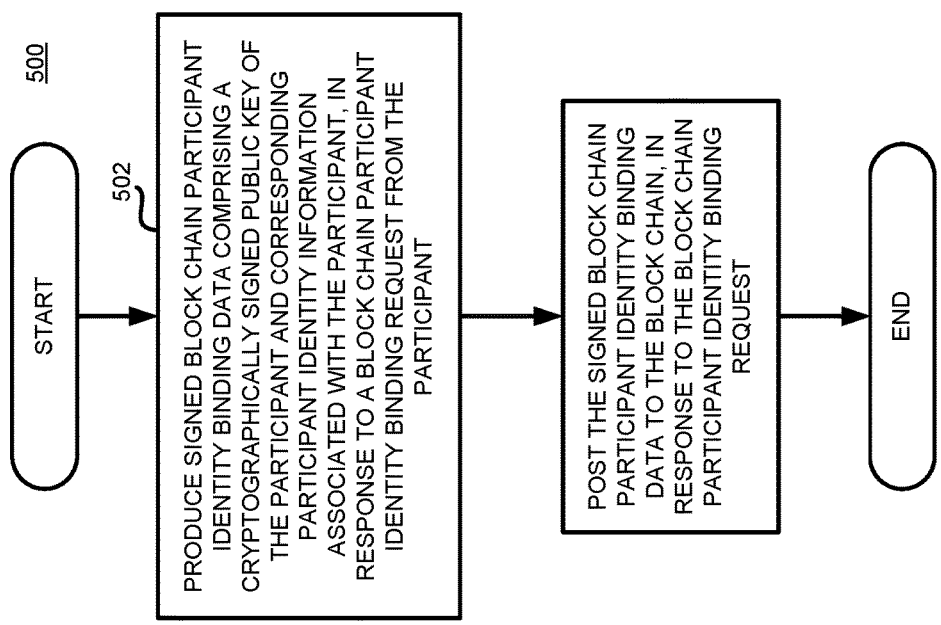
FIG. 5 is a flowchart illustrating a method for providing identity blockchain data in a blockchain in accordance with one example set forth in the disclosure.

Referring also to FIG. 5, a method 500 for providing blockchain data in a blockchain as taken from the perspective of the blockchain identity binder 110 is shown. In block 502, the method includes producing the signed blockchain participant identity binding data 128. This is done by the cryptographic engine 136 in the blockchain identity binder 110, in response to the registration authority 110 instructing (126) the blockchain identity binder to bind the requestor identification information to the requestor's public key. The blockchain identity binder 110 performs the binding by cryptographically signing the requestor participant public key sent in the identity binding request 120 along with the requestor identity information sent in the identity binding request 120, using its private signing key. As such, the signed blockchain participant identity binding data 128 includes a cryptographically signed public key of the participant and corresponding participant identity information associated with the participant that was sent in the blockchain participant identity binding request 120.

Figure 3:
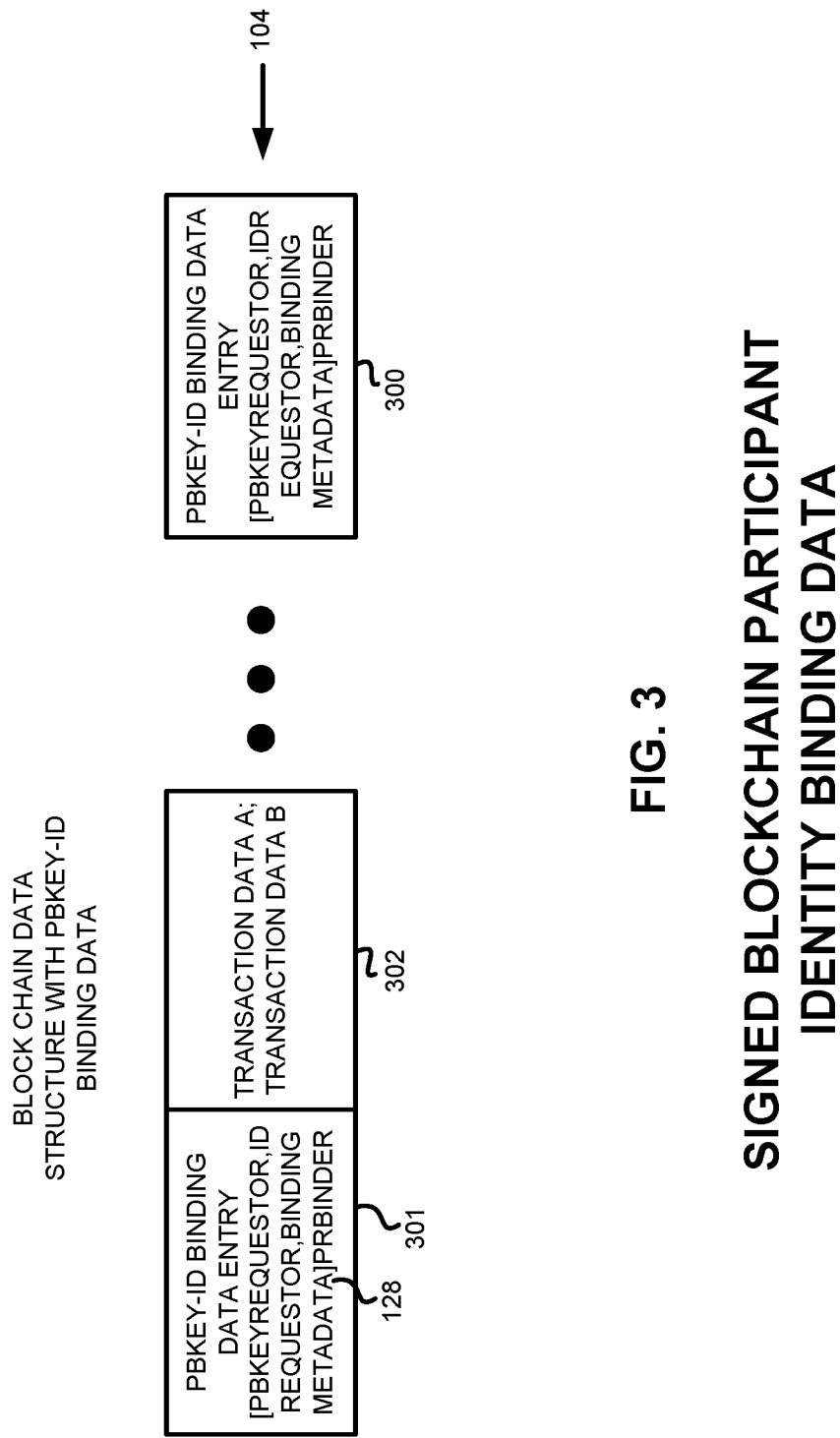
FIG. 3 is a diagram of a blockchain that includes a block having signed blockchain participant identity binding data therein in accordance with one example set forth in the disclosure.

Referring also to FIG. 3, the signed blockchain participant identity binding data 128 is shown as being a block entry 301 in the blockchain 104. The blockchain identity binder 110 posts the signed blockchain participant identity binding data 128 to the blockchain 104, in response to the blockchain participant identity binding request 120 being issued by the participant wanting an identity binding. As shown, the signed blockchain participant identity binding data 128 includes the public key of the requestor, the identity of the requestor, and additional binding metadata being digitally signed using the private signing key of the blockchain identity binder 110. The signature of the binder is done using its private key concatenated with the identity of the binder, its public key or the ID of the public key. The additional binding metadata in one example includes life cycle information such as expiry data indicating when the binding expires, event description data indicating whether the lifecycle event is an initial binding, a renewal binding or a withdrawal of a binding. In one example, the signed blockchain participant identity binding data 128 is not in a digital certificate syntax meaning it is not compliant with, for example, ITU X.509 certificate syntax or other certificate syntax. However, in another example, the signed blockchain participant identity binding data 128 may be formatted in a certificate syntax. Standard certificate syntax uses readily-available software, but it contains redundant features that can negatively impact system and participant efficiency by, among other things, requiring additional unnecessary processor processing and increasing system data usage. As shown, other signed blockchain participant identity binding data 300 is included as blockchain entries for other originators and/or recipients. Transaction data 302 is also included in blocks in the blockchain as known in the art. The signed blockchain participant identity binding data 128 included in the blockchain 104 can provide a higher level of block chain data security by requiring a recipient or other entity to verify that an originator of a transaction is in fact the claimed originator of a transaction in a block is the actual originator and/or requiring an originator to verify that an intended recipient is in fact the appropriate recipient for the transaction. The disclosed public key identity binding can provide lifecycle managed identity security without the need to share authentication secrets—e.g., passwords. The key-id binding could conform with standard certificate syntax, such as ITU X.509. However, such certificates are designed to operate in a different information system architecture; one in which directory technology, such as ITU X.500, provides the repository and communications protocol for publishing and retrieving key-id bindings and associated lifecycle events. This results in the key-id binding data structure containing information specific to that architecture, such as the network location of the repository and processing instructions, that results in an unnecessarily large data structure and an unnecessarily complicated validation procedure. In some certificate architectures, the revocation of a key-id binding is communicated using an online status service. This must be designed to service high peak loads and continue to function in the face of component failure, thereby introducing avoidable costs. For these reasons, key-id bindings adapted for securing blockchain transactions may avoid the use of standard certificate syntax.

Using the blockchain itself to publish and retrieve key-id bindings and related lifecycle events enables a simplified architecture, thereby improving security, reliability and reducing cost. It alleviates the need for the key-ID binder to maintain a redundant, high-availability, database, as the blockchain contains an immutable, visible, record of its actions. This leads to reduced capital and operating costs and reduces the need for a trusted third-party audit.

Referring also to FIG. 6, a method 600 for providing blockchain data in a blockchain taken from the perspective of the originator will be described. As shown in block 602, the originator 106 confirms that its identity has been bound to one or more of its public keys by the binder 100 by searching the block chain for the block containing the signed blockchain participant identity binding data 128 that contains its identity information and/or the binder public key in the block or binder name (if it is used by the binder) or any suitable mechanism. Once confirmed, the originator of the transaction searches the blockchain 104 and retrieves the public encryption keys of the intended recipients using the signed blockchain participant identity data block entries. The originator 106 uses the signed blockchain participant identity binding data 128 to obtain recipient public encryption keys for those recipients that it wishes to have involved in the transaction. The signed blockchain participant identity binding data that contains this information results from the recipients 108 requesting that their public encryption keys be bound to their identity via a blockchain participant identity binding request 120 that occurred prior to the transaction taking place. The originator verifies the public key of the recipient in the binding data 128 by verifying the signature of the binder 110 used to sign the signed blockchain participant identity binding data 128. The signing was done using the private key of the binder 110 so the public key 140 of the binder is used by the originator to verify the signature of the binder 110 on the signed blockchain participant identity binding data. This retrieval of the recipient encryption keys from the signed blockchain participant identity binding data is shown by line 142. The originator 106 may obtain the public key of the binder 110 in any suitable manner including, but not limited to, obtaining the public key originator from the binder's website, the website of the RA or any other suitable mechanism.

As shown in block 604, the method includes the originator encrypting the transaction data using the public encryption keys of all of the recipients in the transaction obtained from the signed blockchain participant identity binding data 128 from corresponding blocks in the blockchain 104 and the originator 106 signs the transaction with its private signing key and posts the transaction as a block to the blockchain shown as line 144. The originator 106 of the transaction has additional security in its choice of recipients by using the signed blockchain participant identity binding data 128 that are in blocks in the blockchain 104.

Figure 7:
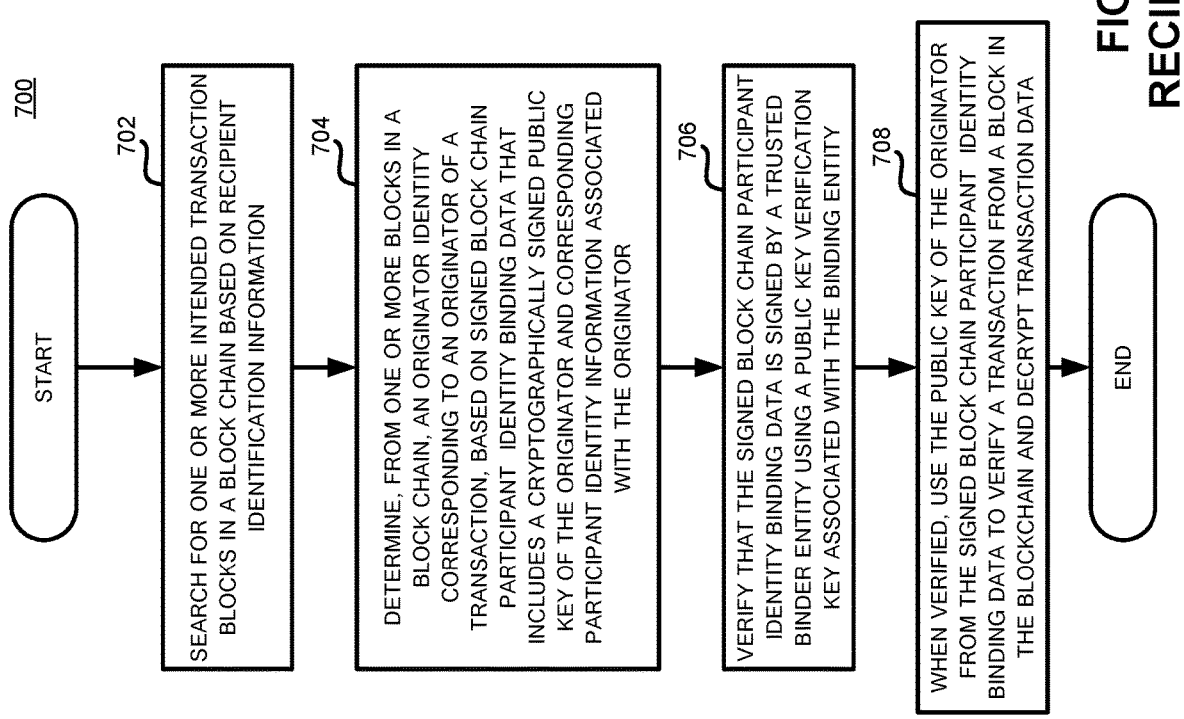
FIG. 7 is a flowchart illustrating a method for providing blockchain data in a blockchain in accordance with one example set forth in the disclosure.

Referring to FIG. 7, a method 700 for providing blockchain data in a blockchain is presented with respect to the recipient 108. The figure also illustrates processing a transaction. As shown in block 702, the recipient searches the blockchain 104 for one or more intended transaction blocks 302 for the recipient. In one example, the recipient searches for its own recipient identification information in blocks in a blockchain that have transaction data. Identifying transaction blocks intended for a particular recipient in a blockchain is known in the art. As shown by line 146 in FIG. 1, the recipient determines, from one or more blocks in a blockchain an originator identity corresponding to the originator of the transaction. This is based on obtaining signed blockchain participant identity binding data 128 that includes the cryptographically signed public key of the originator and corresponding participant identity information associated with the originator to obtain the originator's public verification key. The recipient also obtains any life cycle status update transactions related to the signature verification key of the originator which may be implemented as metadata in signed blockchain participant identity binding data. This is shown in block 704. As shown in block 706, the method includes verifying that the signed blockchain participant identity binding data 128 is signed by a trusted binder 110. This is done using the public signature verification key 140 of the binder. The recipient 108 obtains this binder public key information from the same mechanism used by the originator. As shown in block 708, when the binder signature verifies properly, the recipient uses the public key of the originator that was in the signed blockchain binding data, to verify a transaction in a transaction block that the recipient retrieved shown by line 148. When verified, the recipient uses its private decryption key to decrypt the transaction data that was encrypted by the originator using the public encryption keys obtained from the block chain.

Referring again to FIG. 1, multiple blockchain identity binders 110 may be employed for the same set of public keys and corresponding identity data to provide another higher level of security. The multiple bindings provide additional block system security—assurance is improved when a binding is confirmed by multiple, independent, sources. In this example, a recipient evaluates multiple binding data from different binders. As noted above, recipients use the signed blockchain participant identity binding data to obtain an originator's public verification key to ensure that the transaction came from the appropriate originator and then if the transaction data was encrypted, decrypts the data using its private decryption key.

Stated another way, referring again to FIG. 1 and the numbers 1-6, each operation will be described.

1. System participants request a public-key to identify binding from the registration authority (this includes both originator and recipients). The registration authority confirms that the claimed requestor controls the private key corresponding to the supplied public key. The registration authority instructs the binder to bind the requestor Id to its public key.

2. The binder posts a signed transaction to the blockchain asserting the binding between the requestor Id and its public key. This is done for all requestors. Subsequently, the binder may post related lifecycle transactions, such as ones updating the binding or rescinding the binding.

3. The originator of a transaction consults the blockchain and retrieves the public encryption keys of the intended recipients using the signed blockchain participant identity data blockchain entries. Originator verifies Pbrecipient in binding data using Pbbinder that originator gets from Web site of Binder.

4. The originator encrypts using Pbrecipient from binding data entry and signs the transaction and posts it to the blockchain.

5. The recipients search the blockchain and retrieve transactions intended for them.

6. The recipients search the blockchain to retrieve the originator's signature verification key from binding data associated with originator and any lifecycle status update events related to the key. The recipient verifies the binding data using the Pbbinder (public verification key of the binder 110) it obtained from binder website. If verified, the recipient then verifies the signature on transaction and decrypts the transaction using the recipients private (Pr) decryption key.

In addition or alternatively to the above examples, public/private key pair services may be performed by the blockchain identity binder 110. As an example, a participant's public-key encryption/decryption key pair is generated and stored by the blockchain identity binder 110, and the private decryption part of the key pair is delivered securely to the participant. This is done through suitable messaging between the devices as requests and response in the blockchain itself or if desired through other channels. The participant sends a message to the RA containing identity and/or contact information. The RA confirms or assigns identity information for the particular participant and instructs the blockchain identity (key-id) binder 110 to generate one or more public/private key pairs. A secure channel between the RA and the participant may be established as a byproduct of identity confirmation. The key-id binder binds the public keys to the participant id using its private signature key and sends the corresponding participant private keys to the participant over a secure channel, optionally with the help of the RA. If, on the other hand, the key pair were to be generated by the participant, then it would be susceptible to accidental destruction by the participant, possibly as the result of a machine failure or as a result of the loss of the key activation code. In such an eventuality the participant would permanently lose access to encrypted transactions intended for its use. Where the participant key-pair is generated and reliably stored by the blockchain identity binder 110, the possibility exists to restore a lost private decryption key to the participant. In addition or alternatively, a participant generates the key pairs and then sends them securely to the blockchain identity binder 110 where they are stored securely and managed by the blockchain identity binder 110 so that a lost private kay can be restored to the participant by the blockchain identity binder 110. In this approach, the message from the participant to the RA contains, in addition to identity and/or contact information, both the private and public parts of the key pairs that it wants bound to its identity. The participant must encrypt the private parts of the key pairs such that the key-id binder can decrypt them and confirm that they properly correspond to the public parts. Once the RA has confirmed the requested identity of the participant, it instructs the key-id binder to perform key-id binding as described earlier.

While transactions may be encrypted by the originator such that they may be decrypted by one or more identifiable recipients, in addition or alternatively, transactions are encrypted for any recipient that meets a specified qualification, such as a group membership. In this case, the originator encrypts the transaction using a public encryption key of an authorization server, and attaches data that serves as a policy (known as a smart policy). Any recipient of the encrypted transaction may apply to the authorization server, requesting a copy of the required private decryption key, and demonstrating that the requesting recipient satisfies the requirements of the policy. Having validated the proper qualification of the requestor, the authorization server supplies the requested decryption key, and then the requestor will be able to access the transaction. Even if the requestor did not satisfy the requirements of the policy at the time the transaction was formed, it may still gain access to transaction once it does fulfill the requirements of the policy. This provides a recipient that was not included in a transaction to later become a trusted recipient post issuance of the transaction block to the blockchain.

As a type of summary, in order for source authentication and confidentiality to be provided, the binding of a signature-verification or data-encryption public-key to the identity of the holder of the corresponding private key is visible in the blockchain. This binding is performed by one or more binders. The binders act under the instructions of a registration authority, which is a component that naturally occupies an authoritative role in the business transacted over the blockchain (such as a central bank in the case of financial transactions).

Those who rely on the public key do so by confirming the bindings. They may use a (weighted) quorum formula to enhance the trustworthiness of the aggregate binding. Each recipient assigns a score to each binder in the system. It locates the applicable id-key bindings in the blockchain and accumulates the scores of the binders involved. If the result exceeds a threshold chosen by the recipient, then it accepts the binding. Otherwise, it does not. Originators may act in the same way when processing recipient public-keys for encryption. They confirm individual bindings using the signature verification public key of the binder (i.e., the blockchain identity binder), which they may find in the blockchain.

Bindings may be broken by a compensatory transaction posted in the blockchain. For example, if a binding were subsequently found to be in error or suspect, whether because either the binder's or the participant's private key has been disclosed in violation of policy, or because of a procedural failure in the binding request/response procedure, or because a change in circumstances has rendered the ID invalid.

The above detailed description of the invention and the examples described therein have been presented for the purposes of illustration and description only and not by limitation. The steps above can be done in any suitable order. Also, the combination of the methods is contemplated as an overall system of operation. It is therefore contemplated that the present invention covers any and all modifications, variations or equivalents that fall within the spirit and scope of the basic underlying principles disclosed above and claimed herein.

What is claimed is:

1. A method carried out by an apparatus operative to access blockchain data in a blockchain, the method comprising:
   requesting, by a recipient, signed blockchain recipient identity binding data from a trusted binding entity;
   receiving the signed blockchain recipient identity binding data comprising a public verification key of the trusted binding entity;
   searching for one or more transaction blocks intended for the recipient in a blockchain based on recipient identification information; and
   determining, from one or more blocks in the blockchain, an originator identity corresponding to an originator of a transaction, based on signed blockchain participant identity binding data that was issued by the same trusted binding entity, that comprises a cryptographically signed public key of the originator and corresponding participant identity information associated with the originator;
   verifying that the signed blockchain participant identity binding data is signed by the trusted binder entity using the public verification key associated with the trusted binder entity;
   when verified, using the public key of the originator from the signed blockchain participant identity binding data to verify a transaction from a block in the blockchain.

2. An apparatus operative to access blockchain data in a blockchain comprising:
   one or more processors: and
   memory comprising executable instructions that when executed by the one or more processors cause the one or more processors to:
   request blockchain recipient identity binding data from a trusted binding entity;
   receive the signed blockchain recipient identity binding data comprising a public verification key of the trusted binding entity;
   search for one or more transaction blocks intended for a recipient in a blockchain based on recipient identification information;
   determine, from one or more blocks in the blockchain, an originator identity corresponding to an originator of a transaction, based on signed blockchain participant identity binding data that comprises a cryptographically signed public key of the originator and corresponding participant identity information associated with the originator;
   verify that the signed blockchain participant identity binding data is signed by the trusted binder entity using the public key verification key associated with the trusted binder entity; and
   when verified, use the public key of the originator from the signed blockchain participant identity binding data to verify a transaction from a block in the blockchain.

* * * * *